3,113,953
ESTERS OF 17α-(3-HYDROXY-1-PROPINYL)AN-
DROST - 5 - ENE - 3β,17β - DIOL AND THEIR
PREPARATION
Raymond O. Clinton, East Greenbush Township, Rensselaer County, N.Y., assignor to Sterling Drug Inc., New York, N.Y., a corporation of Delaware
No Drawing. Filed Nov. 28, 1958, Ser. No. 776,741
5 Claims. (Cl. 260—397.5)

This invention relates to new chemical compounds of the steroid series and in particular concerns 17α-(3-hydroxy-1-propinyl)androst-5-ene-3β,17β-diol and the di- and tri-lower-alkyl esters thereof, and to a process for their preparation.

The compounds of the invention possess the following general formula:

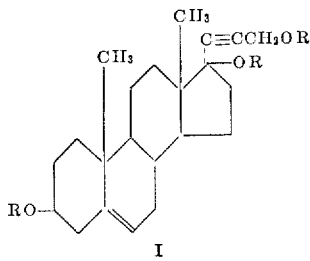

I wherein R is a member of the group consisting of hydrogen and lower-alkanoyl radicals having from 2 to about 6 carbon atoms.

In the above general formula, R can be hydrogen and lower-alkanoyl such as acetyl, propionyl, butyryl, isobutyryl, valeryl, isovaleryl, trimethylacetyl, caproyl, isocaproyl, etc.

The new triol is prepared by condensing dehydroepiandrosterone with the acetylide cation from propargyl alcohol. The esters are prepared from the triol by esterification with an acylating agent as, for example, the appropriate acid anhydride or acid halide under anhydrous conditions. The hydroxyl groups in the 3 and 22-positions are esterified at about room temperature whereas the hindered tertiary hydroxyl at the 17-position is esterified at higher temperatures.

The preferred method for the preparation of the new 3,22-diesters is esterification of the triol with an acid anhydride at room temperature under anhydrous conditions. The reaction mixture is quenched in dilute acid and the desired product removed by filtration.

The preferred method for the preparation of the new 3,17,22-triesters is esterification of the triol with an acid anhydride at a temperature of about 75° C. to about 125° C. and if a solvent is selected which boils in this range, pyridine for example, it is convenient to conduct the reaction at the reflux temperature. After quenching the reaction mixture in dilute acid, the product can be isolated, for instance by filtration.

Alternatively, the reaction mixtures resulting from the esterification with either an acid anhydride or acid halide, after quenching in dilute acid can be purified by passage through a chromatographic column.

The following examples will further illustrate the invention without limiting the invention thereto.

EXAMPLE 1

*17α-(3-Hydroxy-1-Propinyl)Androst-5-Ene-3β,17β-Diol*

A 500 cc. 3-necked, round-bottomed flask was fitted with a stirrer, a condenser cooled by acetone-solid carbon dioxide and dropping funnel. The system was dried and 200 cc. of liquid ammonia added to the flask. To the cool ammonia solution was added 4 g. of potassium followed by the successive dropwise addition of 6.2 g. of propargyl alcohol in 50 cc. of pyridene then 8 g. of dehydroepiandrosterone in 50 ml. of pyridine. The mixture was cooled and stirred for several hours and then left standing overnight at room temperature. The reaction mixture was poured into ice water and left standing for one hour. The almost colorless product which separated was removed by suction filtration and taken up in 1 liter of isopropyl alcohol. Concentration of the solution to about one-third the original volume followed by cooling gave 5.4 g. of 17α-(3-hydroxy-1-propinyl)androst-5-ene-3-β,17β-diol melting at 263° C. with decomposition; $[\alpha]_D^{25} = -123.6° \pm 0.1°$ (0.4% in dioxane).

*Analysis.*—Calcd. for $C_{22}H_{32}O_3$: C, 76.70; H, 9.36. Found: C, 76.74; H, 9.59.

EXAMPLE 2

*17α-(3-Acetoxy-1-Propinyl)Androst-5-Ene-3β,17β-Diol 3,17-Diacetate*

A mixture of 2 g. of 17α-(3-hydroxy-1-propinyl)androst-5-ene-3β,17β-diol, 25 ml. of acetic anhydride and 12 ml. of pyridine was refluxed for 18 hours. The brown solution was quenched in ice water containing sulfuric acid and the solid which separated was collected by filtration. After recrystallization from methanol there was obtained 1.7 g. of 17α-(3-acetoxy-1-propinyl)androst-5-ene-3β,17β-diol 3,17-diacetate, M.P. 140–142° C. (corr.);

$$[\alpha]_D^{25} = -108.2 \pm 0.3°$$

(1% in $CHCl_3$).

*Analysis.*—Calcd. for $C_{28}H_{38}O_6$: C, 71.46; H, 8.14. Found: C, 71.74; H, 8.45.

EXAMPLE 3

*17α-(3-Acetoxy-1-Propinyl)Androst-5-Ene-3β,17β-Diol-3-Acetate*

A mixture of 2 g. of 17α-(3-hydroxy-1-propinyl)androst-5-ene-3β,17β-diol and 20 ml. of acetic anhydride in 10 ml. of pyridine was allowed to stand for 18 hours at room temperature. The resultant solution was quenched in ice water containing sulfuric acid. The solid which separated was recovered by filtration, dried at 70° then taken up in pentane and chromatographed on a 100 g. silica gel column. The column was eluted with pentane containing increasing amounts of ether. The eluate containing 25% ether gave 1.3 g. of 17α-(3-acetoxy-1-propinyl)-androst-5-ene-3β,17β-diol-3-acetate which after recrystallization from methanol had the M.P. 131–134° C. (corr.); $[\alpha]_D^{25} = -103.9° \pm 0.3°$ (1% in $CHCl_3$).

*Analysis.*—Calcd. for $C_{26}H_{36}O_5$: C, 72.86; H, 8.47. Found: C, 73.13; H, 8.21.

EXAMPLE 4

17α-(3-caproxy-1-propinyl)androst-5 - ene-3β,17β-diol-3-caproate can be prepared by reacting 17α-(3-hydroxy-1-propinyl)-androst-5-ene-3β,17β-diol with caprionic anhydride using the procedure described above in Example 3.

EXAMPLE 5

17α - (3 - valeroxy-1-propinyl)androst-5-ene-3β,17β-diol 3,17-divalerate can be prepared by reacting 17α-(3-hydroxy-1-propinyl)androst-5-ene-3β,17β-diol with valeric anhydride using the procedure described above in Example 2.

EXAMPLE 6

17α-(3-propionoxy - 1 - propinyl)androst-5-ene-3β,17β-diol-3,17-dipropionate can be prepared by reacting 17α-(3-hydroxy-1-propinyl)androst-5-ene-3β,17β-diol with propionic anhydride using the procedure described above in Example 2.

EXAMPLE 7

17α-(3-valeroxy-1-propinyl)androst-5-ene-3β,17β-diol-3-valerate can be prepared by reacting 17α-(3-hydroxy-1-propinyl)-androst-5-ene-3β,17β-diol with valeric anhydride using the procedure described above in Example 3.

EXAMPLE 8

17α-(3-butyroxy-1-propinyl)androst-5-ene-3β,17β-diol-3-butyrate can be prepared by reacting 17α-(3-hydroxy-1-propinyl)androst-5-ene-3β,17β-diol with butyric anhydride using the procedure described above in Example 3.

EXAMPLE 9

17α-(3-trimethylacetoxy-1-propinyl)androst-5-ene-3β,17β-diol-3-trimethylacetate can be prepared by reacting 17α-(3-hydroxy-1-propinyl)androst-5-ene-3β,17β-diol with trimethylacetic anhydride using the procedure described above in Example 3.

EXAMPLE 10

17α-(3-caproxy-1-propinyl)androst-5-ene-3β,17β-diol 3,17-dicaproate can be prepared by reacting 17α-(3-hydroxy-1-propinyl)androst-5-ene-3β,17β-diol with caproic anhydride using the procedure described above in Example 2.

EXAMPLE 11

17α-(3-isovaleroxy-1-propinyl)androst-5-ene-3β,17β-diol 3,17-diisovaleroxy can be prepared by reacting 17α-(3-hydroxy-1-propinyl)androst-5-ene-3β,17β-diol wih isovaleric anhydride using the procedure described above in Example 2.

EXAMPLE 12

17α-(3-isobutoxy-1-propinyl)androst-5-ene-3β,17β-diol-3-isobutyrate can be prepared by reacting 17α-(3-hydroxy-1-propinyl)androst-5-ene-3β,17β-diol with isobutyric anhydride using the procedure described above in Example 3.

EXAMPLE 13

17α-(3-propinoxy-1-propinyl)androst-5-ene-3β,17β-diol-3-propionate can be prepared by reacting 17α-(3-hydroxy-1-propinyl)androst-5-ene-3β,17β-diol with propionic anhydride using the procedure described above in Example 3.

The compounds of the invention are pituitary inhibitors at dose levels at which they do not show any appreciable degree of sex hormonal properties. For example, 17-(3-hydroxy-1-propinyl)androst-5-ene-3β,17β-diol was found to inhibit the elaboration of pituitary gonadotrophin at a level of 2–8 mg./kg. body weight. There was no measurable estrogenic or androgenic activity at levels of 10 and 20 mg./kg. body weight respectively. Pituitary inhibitors are useful in the treatment of endocrinological disturbances such as menopausal syndrome, endometriosis, postpartum breast engorgement and functional uterine bleeding. A particular choice from the compounds of the invention can be prepared for use by dispersing it in an aqueous suspension or by dissolving it in a therapeutically acceptable oil or oil-water emulsion for parenteral administration.

I claim:

1. A compound having the formula

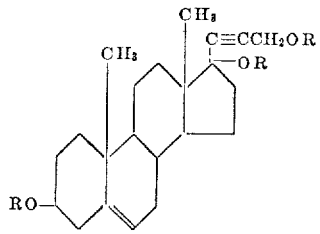

wherein R is a lower-alkanoyl radical having from 2 to about 6 carbon atoms.

2. A compound having the formula

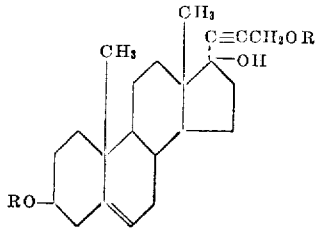

wherein R is a lower-alkanoyl radical having from 2 to about 6 carbon atoms.

3. 17α-(3-hydroxy-1-propinyl)androst-5-ene-3β,17β-diol.

4. 17α-(3-acetoxy-1-propinyl)androst-5-ene-3β,17β-diol-3,17-diacetate.

5. 17α-(3-acetoxy-1-propinyl)androst-5-ene-3β,17β-diol-3-acetate.

References Cited in the file of this patent

UNITED STATES PATENTS 2,868,811    Clinton et al. _____ Jan. 13, 1959

OTHER REFERENCES

"Journal of Chem. Society" (1957), article by Barton et al., pages 5094-5095 relied on.

UNITED STATES PATENT OFFICE

CERTIFICATE OF CORRECTION

Patent No. 3,113,953 December 10, 1963

Raymond O. Clinton

It is hereby certified that error appears in the above numbered patent requiring correction and that the said Letters Patent should read as corrected below.

Column 2, line 2, for "pyridene" read -- pyridine --; lines 46 and 47, strike out "The eluate containing increasing amounts of ether."; same column 2, line 58, for "caprionic" read -- caproic --.

Signed and sealed this 5th day of May 1964.

(SEAL)
Attest:

ERNEST W. SWIDER
Attesting Officer

EDWARD J. BRENNER
Commissioner of Patents